(12) United States Patent
Zheng et al.

(10) Patent No.: US 8,156,373 B2
(45) Date of Patent: Apr. 10, 2012

(54) SYSTEM FOR DISASTER RECOVERY BACKUP AND A METHOD THEREOF

(76) Inventors: Weimin Zheng, Beijing (CN); Hongliang Yu, Beijing (CN)

( * ) Notice: Subject to any disclaimer, the term of this patent is extended or adjusted under 35 U.S.C. 154(b) by 158 days.

(21) Appl. No.: 12/490,817

(22) Filed: Jun. 24, 2009

(65) Prior Publication Data

US 2010/0131794 A1  May 27, 2010

(30) Foreign Application Priority Data

Nov. 21, 2008 (CN) .......................... 2008 1 0227117

(51) Int. Cl.
*G06F 11/00* (2006.01)
(52) U.S. Cl. .............................. 714/15; 714/36; 711/162
(58) Field of Classification Search .................... 714/15; 711/162

See application file for complete search history.

(56) References Cited

U.S. PATENT DOCUMENTS

| | | | |
|---|---|---|---|
| 7,356,679 B1 * | 4/2008 | Le et al. | 713/1 |
| 7,448,034 B2 * | 11/2008 | Anderson et al. | 717/176 |
| 7,487,383 B2 * | 2/2009 | Bensinger | 714/4 |
| 7,805,631 B2 * | 9/2010 | Fries | 714/6 |
| 2004/0172574 A1 * | 9/2004 | Wing et al. | 714/4 |
| 2006/0085792 A1 * | 4/2006 | Traut | 718/100 |
| 2006/0143530 A1 * | 6/2006 | Largman et al. | 714/36 |
| 2007/0260831 A1 * | 11/2007 | Michael et al. | 711/162 |
| 2009/0055822 A1 * | 2/2009 | Tolman et al. | 718/1 |
| 2009/0222496 A1 * | 9/2009 | Liu et al. | 707/204 |
| 2010/0281094 A1 * | 11/2010 | Holt et al. | 709/201 |
| 2010/0299560 A1 * | 11/2010 | Lin | 714/15 |

OTHER PUBLICATIONS

Proceedings of the FAST 2002 Conference on File and Storage Technologies, USENIX Association, Monterey, California, USA, Jan. 28-30, 2002.
Proceedings of the 5th Symposium on Operating Systems Design and Implementation, USENIX Association, Boston, Massachusettes, USA, Dec. 9-11, 2002.

(Continued)

Primary Examiner — Marc Duncan

(57) ABSTRACT

Embodiments disclosed herein related to a system used for disaster recovery backup. The system converts the operating system in the system preparing for disaster recovery into a virtualized system which will be disaster-recovery-ready. The system includes: a device to be converted on which a physical operating system is installed; a USB converting device which is coupled to the device to be converted, which includes a USB disc operating system, a converting unit and a virtual system, and which is used to convert the physical operating system in the device to be converted into a virtual system for making backup of the virtual system. Embodiments disclosed herein are further related to a method for disaster recovery backup and a method for installing the disaster recovery system. The disaster recovery system based on the virtualization technology may be deployed rapidly without making any changes to the physical operating system itself. After conversion, applications in the physical operating system are not influenced by the process of disaster recovery. In addition, because the running environment of virtual system after conversion and that of original physical operating system share the same physical machine, there is no unwanted influence on the virtual system after conversion caused by the difference of properties.

13 Claims, 2 Drawing Sheets

OTHER PUBLICATIONS

Cully, Brenden et al., Remus: High Availability via Asynchronous Virtual Machine Replication, NSDI '08: 5th USENIX Symposium on Networked Systems and Design and Implementation, Apr. 2008.

Ta-Shma, Paula et al., Virtual Machine Time Travel Using Continuous Data Protection and Checkpointing, ACM SIGOPS Operating Systems Review, vol. 42, Issue 1, Jan. 2008.

Chervenak, Ann et al., Protecting File Systems: A Survey of Backup Techniques, Joint NASA and IEEE Mass Storage Conference, 1998.

Laadan, Oren and Nieh, Jason, Transparent Checkpoint-Restart of Multiple Processes on Commodity Operating Systems, USENIX Association, 2007 USENIX Annual Technical Conference, 2007.

Bradford, Robert et al., Live Wide-Area Migration of Virtual Machines Including Local Persistent State, ACM/Usenix International Conference on Virtual Execution Environments, Jun. 13-15, 2007.

Milojicic et al., Process Migration, ACM Computing Surveys, vol. 32, Issue 3, Sep. 2000.

Huang, W. et al., Nomad: Migrating OS-bypass Networks in Virtual Machines, 3rd International ACM SIGPLAN/SIGOPS Conference on Virtual Execution Environments (VEE'07), San Diego, CA, Jun. 2007.

Osman, Steven et al., The Design and Implementation of Zap: A System for Migrating Computing Environments, Proceedings of the 5th Operating Systems Design and Implementation (OSDI 2002), Boston, Massechusettes, Dec. 2002.

Laadan, Oren et al., Transparent Checkpoint-Restart of Distributed Applications on Commodity Clusters, Proceedings of the 2005 IEEE International Conference on Cluster Computing (Cluster 2005), Boston, Massachussetes, Sep. 26-30, 2005.

Soltesz, Stephen et al., Container-based Operating System Virtualization: A Scalable, High-performance Alternative to Hypervisors, Mar. 2007.

Co-pending U.S. Appl. No. 12/490,832 entitled "Virtual Machine-Based On-Demand Parallel Disaster Recovery System and the Method Thereof", to Zheng et al., filed Jun. 24, 2009.

* cited by examiner

SYSTEM FOR DISASTER RECOVERY BACKUP AND A METHOD THEREOF

BACKGROUND OF INVENTION

1. Field of the Invention

The present invention relates to the field of operating system and network storage technology, and particularly to a system for disaster recovery backup and a method thereof.

2. Description of the Relevant Art

In Internet, data is becoming more and more vulnerable of disasters. Great economic loss is encountered in case of data loss, and therefore data security has been shed more light on. The technology of resisting disaster is called disaster recovery backup. The disaster recovery backup system includes a disaster recovered system and a disaster recovery computer. The disaster recovered system transmits disaster recovery data to the disaster recovery computer through network connection in normal operation and acquires all data needed for recovery from the computer after the disaster.

In general, through the way of remote backup, traditional disaster recovery backup technology only copies the data stored in the computer to a remote disaster recovery center through network. In addition, the technology recaptures the lost data from the remote disaster recovery center when disaster happens to achieve the object of reducing the loss caused by the disaster. As the development of virtualization technology, a new disaster recovery backup technology capable of making the backup of the whole running environment as well as data in persistent storage turns up. The disaster recovery backup technology based on virtualization technology has the following features:

1) It can completely recover the running state of the disaster recovered system including the ongoing computing and buffered content in memory that has not been written into disc, etc.
2) The process of disaster recovery is transparent to applications in the disaster recovered system. No change has to be conducted to the running mode of the current programs.

The new backup technology needs to install clients of the disaster recovery system in the disaster recovered system in order to convert the disaster recovered system into a virtualized system. The prior technology concerns of converting the physical machine into a virtual machine and so on. The prior technology affects the disaster recovered system, especially the original applications in the disaster recovered system, and as a result, applications need to be re-installed or re-configured. Typical conversion process from virtualization to realization is shown in FIG. 1, and it includes the following steps:

step 101, manually read the configuration of the disaster recovered system;

step 102, transmit the data in the disaster recovered system to a transfer device; and build a virtual machine according to the configuration read in step 101;

step 103, if the converted virtual machine needs to run in the original computer, the original computer needs to be re-configured according to the configuration of the transfer device; and then the virtual machine is transferred. Wherein, step 103 is optional.

This method suffers from some disadvantages, including:

1) Additional hardware is required and the configuration is complicated. An operation of converting from the physical machine to the virtual machine needs another machine that has at least the same performance as the original machine in order to accommodate the converted virtual machine. In addition, manual work is needed to collect the configuration information of the software and hardware of the disaster recovered system in advance.

2) Unnecessary waste of time. An operation of converting the physical machine into the virtual machine needs to transfer massive amount of data because all the data in persistent storage of the disaster recovery system needs to be copied.

3) It may bring unnecessary impact on the performance of the converted virtual machine that the differences between the configuration of hardware of the machine before conversion and that of the machine after conversion.

SUMMARY OF THE INVENTION

The embodiments disclosed herein convert the operating system in the system preparing for disaster recovery into a virtualized system which will be disaster-recovery-ready. The embodiments disclosed herein aim at providing a system for disaster recovery backup and a method to achieve the object of converting a physical operation system into a virtual system under the condition of making no modification to the original physical system as well as the applications therein, and then minimizing the influence on the disaster recovered system during the conversion from virtualization to realization.

To achieve the aforesaid object, one embodiment provides a system used for disaster recovery backup including:

a device to be converted on which a physical operating system is installed;

a USB converting device which is connected to the device to be converted, which includes a USB drive operating system, a converting unit and a virtual system, and which is used to convert the physical operating system in the device to be converted into the virtual system and make backup of the virtual system.

The USB drive operating system includes: a bootloader which stores the startup information of the operating system is used to load an operating system image and configure startup parameters of the operating system; the operating system image which includes a set of complete operating system is used to provide a host platform in order to mount the operating system on the device to be converted.

The virtual system includes a parent virtual system kernel and a virtual management system used to provide the function of building, configuring, startup and stop for a sub-virtual system and the function of plugging the attached storage device to the device to be converted for the sub-virtual system.

Wherein, the converting unit includes: a unity take-over sub-unit used to start on the USB disc operating system and to take over the device to be converted; a storage device mounting sub-unit used to mount the storage device in the device to be converted and to read the information of the said physical operating system; a system conversion sub-unit used to build and configure a sub-virtual system and to map the root device and other devices of the physical operating system of said the device to be converted onto the root device and the corresponding devices of the sub-virtual system under the condition of keeping the mapping relation and sequence; and a system startup sub-unit used to start the sub-virtual system built by the said system converting sub-unit.

A further embodiment provides a method for disaster recovery backup that includes: recognizing the storage device of the device to be converted; recognizing and mounting the partitions of the storage device of the to-be-converted device; reading the system configuration information in the said mounted partitions of the storage device; constructing the configuration of the virtual system according to the acquired system configuration information; building a virtual system and starting the virtual system according to the said configuration of the virtual system; and making a backup of the information of the virtual system.

Wherein, recognizing and mounting the partitions of the said storage device of the to-be-converted device is performed by: recognizing the file system on the said storage device; and mounting all the recognized file systems.

Wherein, reading the system configuration information in the said mounted partitions of the storage device includes: locating the system configuration information of the said mounted partitions of the storage device; and reading the located varieties of system configuration information.

Wherein, making the backup of the information of the virtual system specifically includes: freezing the running state of the virtual system; copying the whole frozen virtual system to a remote backup system and restarting the said virtual system.

Wherein, after making the backup of the information of the virtual system, the method for disaster recovery backup further includes a process of data recovery which includes: capturing the image of the frozen virtual system from the said remote backup system and loading the image on the local virtual system to enable the virtual system to be recovered to the running state at the time when the image is frozen.

Wherein, the system configuration information includes: network configuration information, startup configuration information, and memory and hard disc configuration information.

Another embodiment includes a method for installing the disaster recovery system, which includes: making the system readable; reading the configuration information; building the virtual system; and starting the said virtual system.

Wherein, making the system readable includes: setting the boot device of the system to USB; starting the said USB drive operating system; starting the said virtual system; starting the said conversion process of the converting unit to make the conversion process run as a daemon in memory and be prepared to operate; and mounting the said storage device of the to-be-converted device.

Wherein, reading the configuration information and building the virtual system includes: reading the partitions information of the mounted storage device; reading the system configuration information of the partitions of the mounted storage device; integrating the acquired system configuration information and generating readable configuration files of the virtual system; and building a new virtual system according to the configuration files of the said virtual system.

In comparison with the prior art, the embodiments disclosed herein have the following advantages:

The disaster recovery system based on the virtualization technology in the disclosed embodiments can be deployed rapidly, introducing no change to the physical operating system itself. After conversion, the applications in the physical operating system are not influenced by the process of disaster recovery. In addition, because the running environment of virtual system after converted and that of original physical operating system shares the same identical machine, there is no unnecessary influence on the performance of the virtual system after converted caused by different environments.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
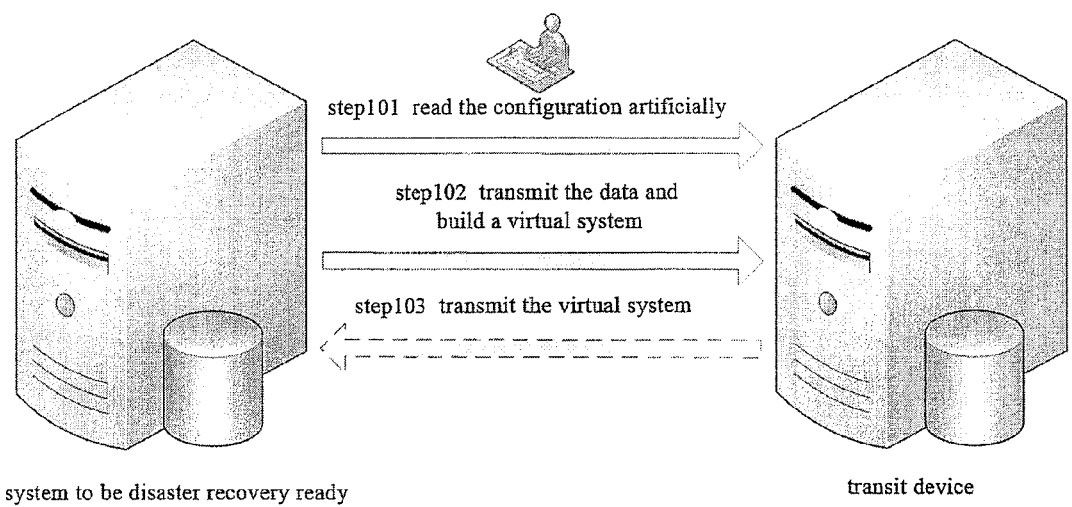
FIG. 1 illustrates the flow chart of the conversion process from virtualization to realization of the prior art.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Hereafter will describe the examples of the present invention in detail with reference to the figures. The following examples are used to describe the present invention, but not to limit the extent of the present invention.

The embodiments disclosed use the implementation of the virtualization technology based on OPENVZ operating system and FEDORA CORE 8 LINUX operating system as an example.

Figure 2:
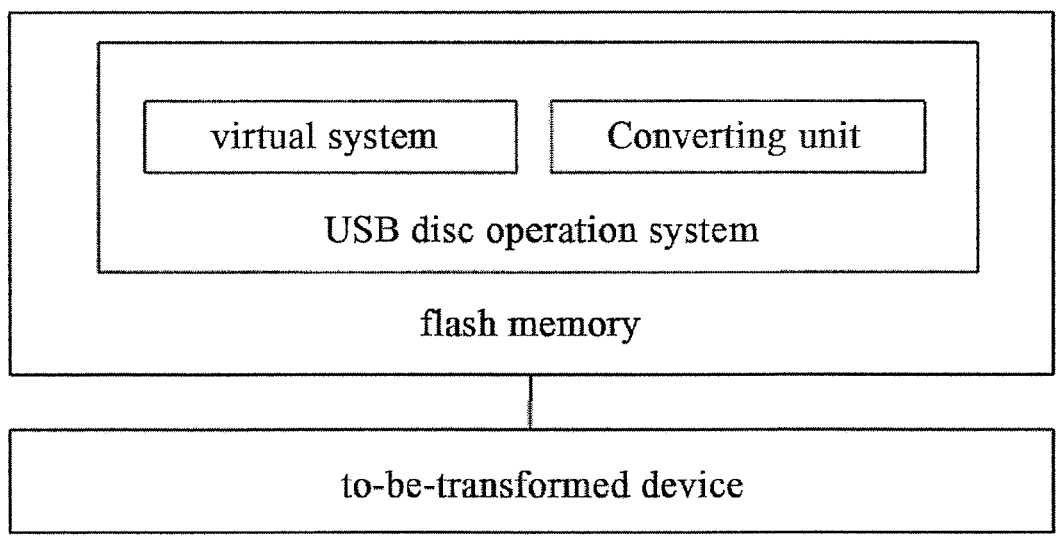
FIG. 2 illustrates the structure diagram of the system for disaster recovery backup in the example of the present invention.

First, the structure of the USB device used to convert a physical operating system into a virtual machine will be demonstrated. An embodiment of the structure of a system for disaster recovery backup is shown in FIG. 2, which includes a to-be-converted device and a USB device used to convert the physical operating system into the virtual system. The USB device includes:

Component 1: a USB flash memory, of which the hardware part is a USB flash memory formatted to a proper file system. In addition, the computer to be converted must be able to boot from USB device, such as USB-HDD.

Component 2: a USB drive operating system. The software of the operating system is solidified on the USB flash memory and it meets the following criteria:

A1. its volume is small enough to fit the capacity of the USB flash memory.

A2. it is able to startup itself.

A3. it supports automatically running applications upon startup.

It is a feasible implementation to make a LIVE CD that can be started and then to solidify it to the system on the USB disc. LIVECD-TOOLS of FEDORA CORE 8 (hereafter it is called LIVECD-TOOLS for short) is taken as an example. A method of making a LIVE CD includes:

B1. Acquiring a configuration template of the operating system provided by the FEDORA CORE project and usually using the accompanied sample configuration files after installing LIVECD-TOOLS.

B2. Using the tools of the self-started disc of LIVECD-TOOLS, and building an ISO image of the self-started disc according to the configuration files mentioned in step B1.

B3. Using the disc image of LIVECD-TOOLS and the system conversion tools of the USB flash memory, converting the ISO image built in step B2 into a USB flash memory.

B4. Mounting the file system of the USB flash memory prepared in step B3, reading the image files in the operating system of the file system by using the file system tools of SQUASHFS (the format of the image files is SQUASHFS), installing component 4 on the image of the operating system, and setting the self-start mode.

B5. Recompressing the image of the operating system that integrates component 4 by a file system tool named MKSQUASHFS.

Figure 3:
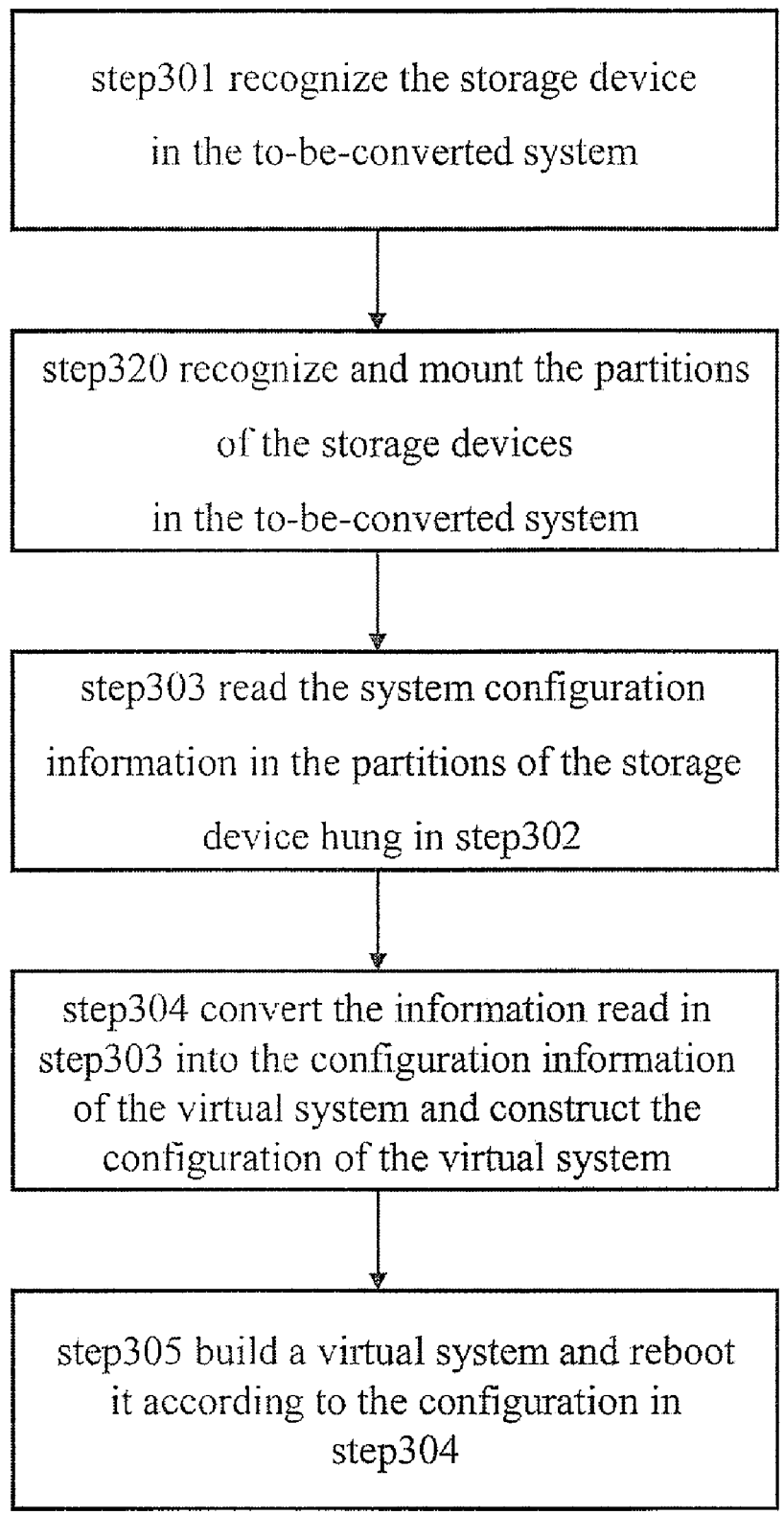
FIG. 3 illustrates the flow chart of the conversion process from virtualization to realization in the example of the present invention.

Component 3: a virtual system. The virtual machine software is used in the example, which is installed in the operating system of component 2, and which supports the function of mounting the hard disc of the computer to be converted in a certain way to make the hard disc the primary partition of the virtual machine and supports the file system in the computer's disc. It is a feasible implementation to install the current virtual machine system on the operating system of component 2 before the operating system of component 2 is solidified. For example, the implementation based on OPENVZ makes it necessary to install the kernel of OPENVZ and component 4 on the operating system in the USB flash memory simultaneously after step B4. Component 4: a converting unit. It is used to convert the physical operating system of the to-be-converted device into a virtual system. The conversion process from realization to virtualization of the unit is shown in FIG. 3 and it includes:

Step 301: recognizing the hard disc device. The computer is converted be under the control of component 2 during this step. A feasible implementation is to read the device list of component 2 and to examine the hard disc device in the list, such as scanning /DEV directory in LINUX operating system, or calling the API for acquiring system information in WINDOWS operating system.

Step 302: recognizing and mounting the partitions of the hard disc of the computer to be converted. This process includes:

Step 321: recognizing the file system in the hard disc device. This step reads the partition list of the hard disc that has been recognized in step 311 and recognizes the file system.

Step 322: mounting all the file systems that have been recognized. This step needs the support of component 2. That is, all the file systems of the computer to be converted need to be identifiable, for example, in LINUX operating system, recognizing a file system needs kernel support.

Step 303: reading the system configuration information in the partitions of the hard disc mounted in step 302, such as typical configuration information of network configuration and partition table, etc. The step includes:

Step 331: locating the system configuration information in the partitions of the hard disc mounted in step 302. For example, in LINUX system, configuration information is usually stored in /ETC directory, while in WINDOWS system, it is usually stored in registry.

Step 332: reading varieties of system configuration information, such as network configuration, startup configuration, memory and hard disc configuration, etc. For example, in a common LINUX system, it is usual to read IP configuration information from /ETC/SYSCONFIG/NETWORK-SCRIPTS/directory and to read the self-started service list from /ETC/RC*, etc.

Step 304: converting the information read in step 303 into the configuration information of the virtual machine and constructing the configuration of the virtual machine. The key step in step 304 is to set the primary partition of the virtual machine as the primary partition mounted in step 302. A feasible implementation is to analyze and to constrict the configuration file, including varieties of configuration information such as memory, size of hard disc, etc., of the virtual machine in a virtual machine system. During the virtualization implemented through OPENVZ system, it is only needed to write conf files of the virtual machine. For example, the corresponding CONF file name of No. 101 virtual machine is 101.conf. Step 304 includes:

C1. Setting memory parameters of the virtual machine and configuring parameters of PRIVVMPAGES and SHMPAGES according to the memory information acquired in step 303.

C2. Setting IP address, gateway, subnet mask, DNS address, etc, for the virtual machine.

C3. the information of hard disc has been read in step 303 which indicates that the devices on the hard disc are the devices under /DEV directory, so this step converts all the devices to the virtual machine through DEVICE FORWARD interface provided by OPENVZ.

Step 305 builds a virtual machine and starts it according to the configuration in step 304. Applying the virtualization powered by OPENVZ OS virtualization technology, this step starts the virtual machine by the VZCTL virtual machine management tools provided by OPENVZ.

Until now, the computer has been converted into a virtual machine. The subsequent processes such as disaster recovery backup based on the virtual machine can then be conducted. Disaster recovery of the virtual system includes:

401: Freezing the virtual system. Freezing the virtual system needs the support of the virtualization technology. The implementation of this step is to freeze the running state of the virtual system to enable the virtual system to be copied and transferred. For example, for the virtual machine disaster recovery system powered by the OS virtualization technology, the step of freezing virtual machine needs to freeze the processes in virtual machine. However, for the virtual machine disaster recovery system powered by conventional virtual machine technology, the step of freezing virtual machine needs to freeze all the processes of virtual machine including virtual machine operating, system.

402: Remote backup. This step copies the whole virtual machine frozen in step 401 to the remote backup system and then restarts the virtual machine.

403: Recovering. This step is conducted when disaster happens. The steps include: capturing the frozen virtual system image from the remote backup system and loading the image on the local virtual system in order to make the virtual system be capable of running normally and be recovered to the running state at the moment when the image is frozen.

Another embodiment relates to a method for installing the disaster recovery system based on virtual machine, the said method includes the step of conversion from virtualization to realization and the step of disaster recovery of virtual machine. The phases of the step of conversion from virtualization to realization can be completed automatically with the help of the USB device which converts the physical operating system into a virtual machine provided. Conversion from virtualization to realization includes:

Step 501: making the system readable. This step is conducted by component 1 and component 2 of the USB device. Wherein, component 1 and component 2 can restart the system and make it under the control of component 2. This step includes:

Step 511: setting the system to boot from USB, such as USB-HDD. Then the system can be started by setting the boot order in BIOS.

Step 512: Starting the operating system in component 2. This step is conducted automatically. For example, the operating system can be started automatically by starting FEDORA CORE 8 system of the manager through using GRUB.

Step 513: Starting the virtual machine system of component 3. This step is conducted automatically. During the virtualization realized by OPENVZ operating system, OPENVZ is loaded as linux kernel.

Step 514: Loading the conversion process of component 4 into memory and preparing to operate the conversion process. In this step, component 4 needs to be preset to be started along with the system. However, in LINUX system, it is only need to add component 4 into /ETC/RC.LOCAL.

Step 515: Mounting the hard disc of the to-be-converted computer to make it readable by component 2, 3 and 4. In LINUX system, MOUNT command can be used to mount the hard disc.

Step 502: reading the configuration information and building the virtual machine. This step is conducted by step 1 to step 4 of component 3 and 4; and it includes:

Step 521: reading the partition information of the hard disc of the computer mounted in step 515.

Step 522: reading the configuration information from each partition. For example, reading the information in memory and hard disc of the to-be-converted computer and the network configuration information through the interface provided by component 2.

Step 523: integrating the information acquired in step 522 and generating readable configuration files of virtual machine of component 3 according to the regulations of component 3.

Step 524: building a new virtual machine through the configuration files of the virtual machine built in step 523 using the function provided by component 3.

Step 503: starting the virtual machine. The step includes:

Step 531: component 4 starts the virtual machine through the interface provided by component 3.

Step 532: component 4 sets the virtual machine to be started along with the system by the interface provided by component 2.

The disaster recovery system based on the virtualization technology in the disclosed embodiments can be deployed rapidly and makes no change to the physical operating system itself. After conversion, the applications in the physical operating system are not influenced by the process of disaster recovery. In addition, because the running environment of virtual system after converted and that of original physical operating system are the same identical machine, there is no unnecessary influence on the performance of the virtual system after converted caused by the difference of performance.

Although the present invention has been described herein with reference to particular exemplary embodiments, certain alterations and modifications may be apparent to those skilled in the art, without departing from the scope of the invention, which should be fallen into the protection scope of the present invention.

What is claimed is:

1. A system for disaster recovery backup comprising:
a device to be converted on which a physical operating system is installed;
a USB converting device which is coupled to the device to be converted, which comprises a USB flash memory operating system, a converting unit and a virtual system, and which is used to convert the physical operating system in the device to be converted into a sub-operating system of the said virtual system and make the backup of a whole system state of the sub-operating system.

2. The system for disaster recovery backup in claim 1, wherein the USB flash memory operating system comprises:
a bootloader which stores the startup information of the operating system and is used to load an operating system image and to configure start parameters of the operating system; and
the operating system image which comprises a complete set of the operating system and is used to provide a host platform in order to mount the operating system on the device to be converted.

3. The system for disaster recovery backup in claim 1, wherein the virtual system comprises a parent virtual system kernel and a virtual management system, the virtual management system is used to provide the function of building, configuring, starting and stopping of a sub-virtual system and the function of mounting the attached storage device to the device to be converted for the sub-virtual system.

4. The system for disaster recovery backup in claim 1, wherein the converting unit comprises:
a unity take-over sub-unit used to start on the USB disc operating system and to take over the device to be converted;
a storage device mounting sub-unit used to mount the storage device on the device to be converted and to read the information of the said physical operating system;
a system converting sub-unit used to build and configure a sub-virtual system and to map the root device and other devices of the physical operating system of the said device to be converted onto the root device and the corresponding devices of the sub-virtual system under the condition of keeping the mapping relation and sequence; and
a system startup sub-unit used to start the sub-virtual system built by the said system converting sub-unit.

5. A method for disaster recovery backup based on the said system in claim 1, comprising:
recognizing the storage device of the device to be converted;
recognizing and mounting the partitions of the storage device of the to-be-converted device;
reading the system configuration information in the said mounted partitions of the storage device;
constructing the configuration of the virtual system according to the read system configuration information;
building a virtual system and starting the virtual system according to the said configuration of the virtual system; and
making a backup of the information of the virtual system.

6. The method for disaster recovery backup according to claim 5, wherein recognizing and mounting the partitions of the said storage device of the to-be-converted device comprises:
recognizing the file system on the storage device; and
mounting all the recognized file systems.

7. The method for disaster recovery backup according to claim 5, wherein reading the system configuration information in the said mounted partitions of the storage device comprises:
   locating the system configuration information of the mounted partitions of the said storage device; and
   reading the located varieties of system configuration information.

8. The method for disaster recovery backup according to claim 5, wherein making the backup of the information of the virtual system comprises:
   freezing the running state of the virtual system; and
   copying the whole frozen virtual system to a remote backup system and restarting the virtual system.

9. The method for disaster recovery backup according to claim 8, wherein after making the backup of the information of the virtual system, the method for disaster recovery backup further comprises the step of data recovery which comprises:
   acquiring the image of the frozen virtual system from the said remote backup system and loading the image on the local virtual system to setting the virtual system to be recovered to the running state at the time when the image is frozen.

10. The method for disaster recovery backup according to claim 5, wherein the system configuration information comprises: network configuration information, start configuration information, memory and hard disc configuration information.

11. A method for installing the disaster recovery system based on the system in claim 1, comprising:
   making the system readable;
   reading the configuration information and building the virtual system; and
   starting the said virtual system.

12. The method for installing the disaster recovery system in claim 11, wherein making the system readable comprises:
   setting the system to be started by the way of USB;
   starting the said USB flash memory operating system;
   starting the said virtual system;
   starting the said conversion process of the converting unit to load the conversion process into memory and preparing to operate the conversion process; and
   mounting the said storage device of the to-be-converted device.

13. The method for installing the disaster recovery system in claim 12, wherein reading the configuration information and building the virtual system comprises:
   reading the partitions information of the mounted storage device;
   reading the system configuration information of the partitions of the mounted storage device;
   reading the acquired system configuration information and generating the readable configuration files of the virtual system; and
   building a new virtual system according to the configuration files of the said virtual system.

* * * * *